June 30, 1931.  W. P. AGNEW  1,812,231
COMBINED GAS SAVING AND LUBRICATING MEANS
Filed June 28, 1929
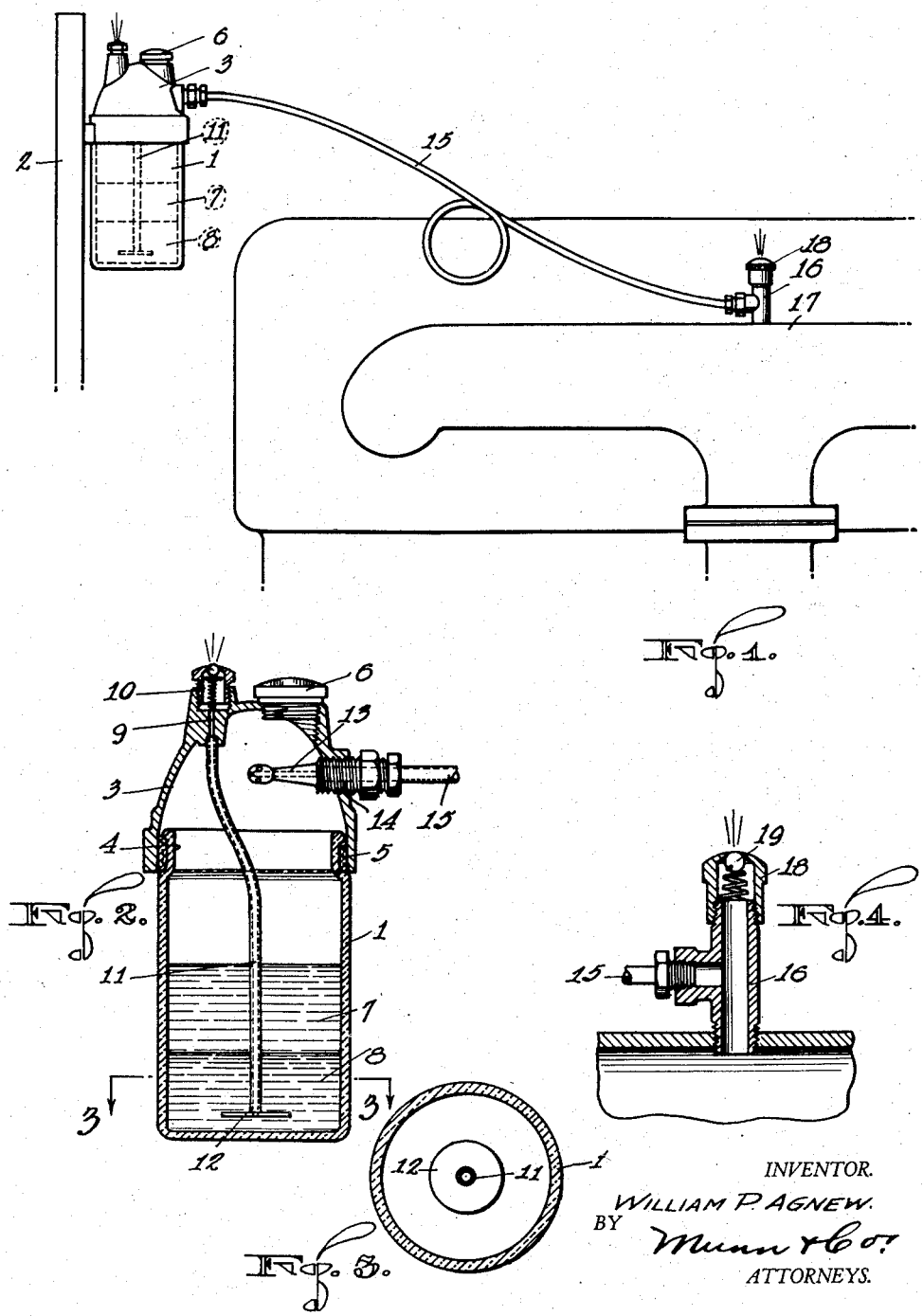
INVENTOR.
WILLIAM P. AGNEW.
BY Munn & Co.
ATTORNEYS.

Patented June 30, 1931

1,812,231

UNITED STATES PATENT OFFICE

WILLIAM P. AGNEW, OF SAN FRANCISCO, CALIFORNIA

COMBINED GAS SAVING AND LUBRICATING MEANS

Application filed June 28, 1929. Serial No. 374,498.

The present invention relates to improvements in a method of and device for admitting a lubricant and moisture into the combustion chamber of an internal combustion engine, and has for its principal object to increase the efficiency and economy of the engine by saving fuel and to also extend the life of the engine by proper lubrication.

More particularly it is proposed to use air as a carrier for the lubricant and the moisture and to cause the lubricant to be carried into the combustion chamber in the form of a very fine spray and without changing the lubricant into a vapor.

It is further proposed in the present invention to cause a body of lubricant to be confined in one chamber with a body of water and to subject the liquids to the suction of the engine, which causes air to be drawn through the liquids into the engine, the air carrying along with it an oleaginous moisture to the combustion chamber.

Further objects and advantages of my invention will appear as the specification proceeds.

The preferred form of my invention is illustrated in the accompanying drawings, in which Figure 1 shows the engine of a motor vehicle having my device connected thereto, Figure 2 a vertical section through a vessel forming the principal part of my device, Figure 3 a horizontal section taken along line 3—3 of Figure 2, and Figure 4 a vertical section through a valve forming part of my invention.

While I have shown only the preferred form of the invention, I wish to have it understood that various changes or modifications may be made within the scope of the claim hereto attached without departing from the spirit of the invention.

In its preferred form, my invention comprises a vessel 1 preferably made of glass so as to be transparent, and adapted for fastening to any suitable part 2 of the motor vehicle, and having a cover 3 fastened over the slightly reduced neck 4 thereof, a suitable gasket 5, being interposed between the cap and the vessel for making the connection water tight. This vessel may be filled through a removable cap 6 in the cover and to a suitable height with water and a lubricating oil, the latter under the laws of gravitation forming a stratum 7 overlying the body 8 of water as long as the device is at rest.

The cover is formed with a perforation 9 connected with the atmosphere through a spring-operated ball valve indicated at 10 and communicating within the container with a tube 11 leading to within close proximity of the bottom of the vessel and terminating at its bottom end in a disc 12 which serves to spread air drawn into the vessel through the tube from the outside.

There also extends into the upper space of the vessel a nipple 13 threaded into the cover as shown at 14 and connected through a tube 15 with a T shown at 16 communicating with the intake manifold 17 of the internal combustion engine. The T has its upright end closed by a cap 18 containing a spring-operated ball valve 19 which serves as an auxiliary air intake.

The operation of my invention is as follows: When the engine is in operation, a vacuum is created above the liquids within the vessel 1 and air is drawn through the valve 10 and the tube 11 into the body of water in close proximity to the bottom of the vessel and thence through the water and the oil into the nipple 13 and through the tube 15 into the manifold 17 where it mixes with the charge coming from the carburetor. The air passing through the two liquids causes the same to be agitated and to mix thoroughly so as to become an emulsion in which the oil is carried by the water in minute particles. The air passing through the liquids carries along with it moisture from the water and small particles of oil held in suspension in said moisture so that it enters the combustion chamber of the internal combustion engine in the form of oil carrying or oleaginous vapor, the vapor serving to improve the efficiency of the charge, and the oil serving to lubricate the bearing parts of the combustion chamber and prevent rust from the water vapor.

The air valve 10 at the top of the vessel 1 is automatic in action and is adjustable, and regulates the amount of the mixture found most effective in meeting the varying engine speeds by synchronizing with them.

The auxiliary automatic air valve 19 is used as a part of the fixture to relieve the suction through the tube 15 at low engine throttle, at which time the suction in the manifold of the engine is greatest and the admixture is least needed.

It should be particularly noted that the oil coming from the same chamber with the water is not used as a fuel, and that neither the water nor the oil are preheated. While the water is vaporized, the oil is not, and reaches the combustion chamber unchanged as a lubricant and not in the form of an oil vapor.

I claim:

A gas saver for internal combustion engines comprising a vessel adapted for supporting a stratum of lubricating oil above a body of water, a conduit extending into the vessel above the stratum of oil and connecting with the intake manifold of the engine, a tube connecting with the atmosphere and extending into the body of water for allowing air to enter, and a disc at the end of the tube forcing the air to spread as it leaves the tube.

WILLIAM P. AGNEW.